April 17, 1962  R. J. CERNY ETAL  3,030,598
ELECTRICAL FUEL FEED REGULATION DEVICE FOR ENGINES
Filed Sept. 10, 1959  2 Sheets-Sheet 1

INVENTORS
RUDOLPH J. CERNY
THOMAS K. KJELLMAN
BY K. G. Doub
ATTORNEY

INVENTORS
RUDOLPH J. CERNY
THOMAS K. KJELLMAN
BY K. G. Doub
ATTORNEY

{ # United States Patent Office

3,030,598
Patented Apr. 17, 1962

3,030,598
ELECTRICAL FUEL FEED REGULATION DEVICE FOR ENGINES
Rudolph J. Cerny and Thomas K. Kjellman, Timonium, Md., assignors to The Bendix Corporation, a corporation of Delaware
Filed Sept. 10, 1959, Ser. No. 839,113
2 Claims. (Cl. 338—41)

This invention relates to a pressure-responsive control device for varying the resistance of an electric circuit as a function of changes in operating pressures, for example, altitude and manifold pressure in the operation of an internal combustion engine.

Copending application Serial No. 653,556, filed April 18, 1957 (common assignee), now Patent No. 2,915,725, shows a compact and extremely simple electrical device in the nature of a pressure-responsive rheostat to be incorporated in an electric direct fuel-injection system for internal combustion engines, to compensate the rate of fuel feed for changes in altitude or air density. In the patented device, a spring-pressed, rod-shaped resistor, pivoted at one end, is "tracked" by an arcuate contact arm, actuated by a capsule, responsive to changes in altitude or ambient air density. While this device may rate as a satisfactory control for certain types of fuel feeding system, it does not so rate for others, for the reason that it fails to sense throttle position, and when a throttle-responsive means is added to fulfill such function, there still remains a problem due to the fixed curvature of the contact arm which determines the non-linear contour of the curves of FIG. 4. To illustrate, reference may be had to FIG. 4, which shows a typical performance requirement curve for the fuel control system of an automotive engine. Here the resistance to be varied, as a function of altitude, is plotted in percentage against variations in manifold pressure absolute from closed to wide-open throttle (W.O.T.). Curve A–1 represents acceleration from closed to wide-open throttle at seat level, A–2 at 12,000 feet and A–3 at 6,000 feet altitude. Note that all three curves originate at 10 inches Hg, which in this instance is a closed-throttle condition, and that curve A–2 has the same contour as curve A–1 starting in the region where the latter crosses the 20 inch Hg vs. resistance point and terminating at the wide-open throttle line. In other words, if curve A–2 were superposed on that portion of curve A–1, there would be substantially no deviation between the curves. This means that the same fuel/air ratio selected for best economy at part-throttle settings and best power at full throttle settings at sea level is being maintained at all altitudes. This requirement can be readily met by the device herein disclosed.

An object of the present invention, therefore, is to provide a simple yet highly sensitive, pressure-responsive electrical control device for use in electrical fuel-feeding systems for engines which will maintain a selected fuel/air ratio over the entire acceleration and deceleration range at all altitudes.

Another object is to provide a device for varying the resistance of an electrical circuit for controlling the rate of fuel feed to an engine along a selected resistance vs. manifold pressure curve at all altitudes, said device having the advantages which accrue from the use of anti-friction arcuate-shaped contact arms.

The foregoing and other objects and advantages will become apparent in view of the following description taken in conjunction with the drawings, wherein.

Figure 2:
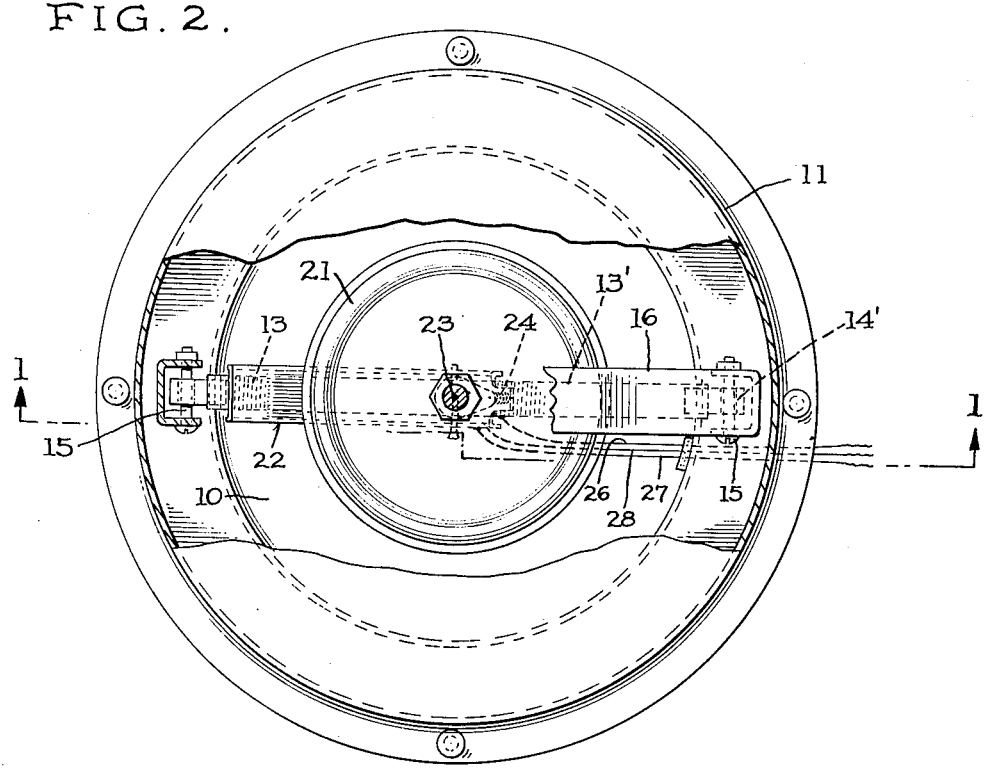
FIG. 2 is a top plan view of the device of FIG. 1, partly broken away to expose certain operating parts.

Referring to the drawings in detail, the parts of the device are mounted in a housing made up of a deeply-dished base 10 and a cover 11, these parts having peripheral flanges which may be secured to one another in air-tight relation in any suitable manner, defining a chamber 12, which is vented to the atmosphere. A resistor 13, here shown as of the fine wire type wound on an insulated rod 13', is fixedly supported by end brackets 14 and 14', having elongated slots therein, adapted to receive screws 15, for adjustably mounting the opposite ends of the rod to a main supporting bracket 16, the ends of which are inturned and secured to the flange of the base 10.

A pressure-responsive capsule 17 is mounted in the base 10 and has its interior vented to manifold pressure absolute by means of an insulated fitting 18. Since this capsule is also exposed to ambient air pressure in chamber 12, it will respond to changes in manifold pressure as modified by changes in altitude or ambient air density. A rockable contact arm 19, of arcuate-shaped contour, is pivotally connected to the movable wall of the capsule 17 by means of said insulated fitting 18 and stud 18'. A spring 19' has its one end connected to the rear end of said arm and its opposite end to a clip 20; it functions to normally urge the arm in a clockwise direction.

An aneroid capsule 21 is mounted to the bracket 16 in the chamber 12; it has connected to the movable wall thereof by means of insulated fitting 23 an arcuate-shaped contact arm 22 which may be similar in all respects to the arm 19. A spring 24 has its one end connected to the rear end of the arm 22 and its opposite end to a member 25; it functions to normally urge the arm 22 in a counterclockwise direction. The capsule 21 may be evacuated to a predetermined degree and/or charged with an inert gas; it responds to changes in air density in a manner well understood by those having a layman's knowledge of the art.

*Operation*

In practice, the device herein disclosed is primarily adapted for installation in the altitude-correction circuit of an electric direct fuel injection system for the internal combustion engine of a motor vehicle. A system for which the device has been especially designed is disclosed in copending application Serial No. 637,852, filed February 4, 1957, now Patent No. 2,980,090 (common assignee). Normally, the altitude range runs from sea level to around 12,000 feet.

There are a number of ways in which the device may be utilized in a fuel control circuit, but to simplify the explanation of operation, it will be assumed that the resistor 13 is connected in series with contact arms 19 and 22 in a manner such that the rate of fuel feed varies directly as the drop across the resistor; i.e., at maximum drop, the rate of fuel feed is such as to obtain a fuel/air ratio for wide-open throttle and decreases as the throttle is moved toward closed position and the manifold pressure decreases. So connected, the lead 26 would be "dead." If now the manifold pressure contact 19 is moved from the position shown at *a* in FIG. 3 to the left (throttle-closing response) the rate of fuel feed will decrease, and if moved from an intermediate position to the right (throttle-opening response), the rate of fuel feed will increase; and if the altitude contact 22 is moved from the position shown at *a* in FIG. 3 to the right (increase in altitude or decrease in air density), the rate of fuel feed will decrease at a given throttle opening, and if moved from an intermediate position to the left (decrease in altitude or increase in air density), the rate of fuel feed will increase at a given throttle opening. Since manifold pressure varies with throttle position and since the capsule 17 senses both manifold pressure absolute and ambient air pressure, as the throttle is opened or closed, the contact 19 will move to the right or left as a function of manifold pressure and altitude or ambient air density while the contact 22 will move to the right or left solely as a function of altitude or air density.

Figure 4:
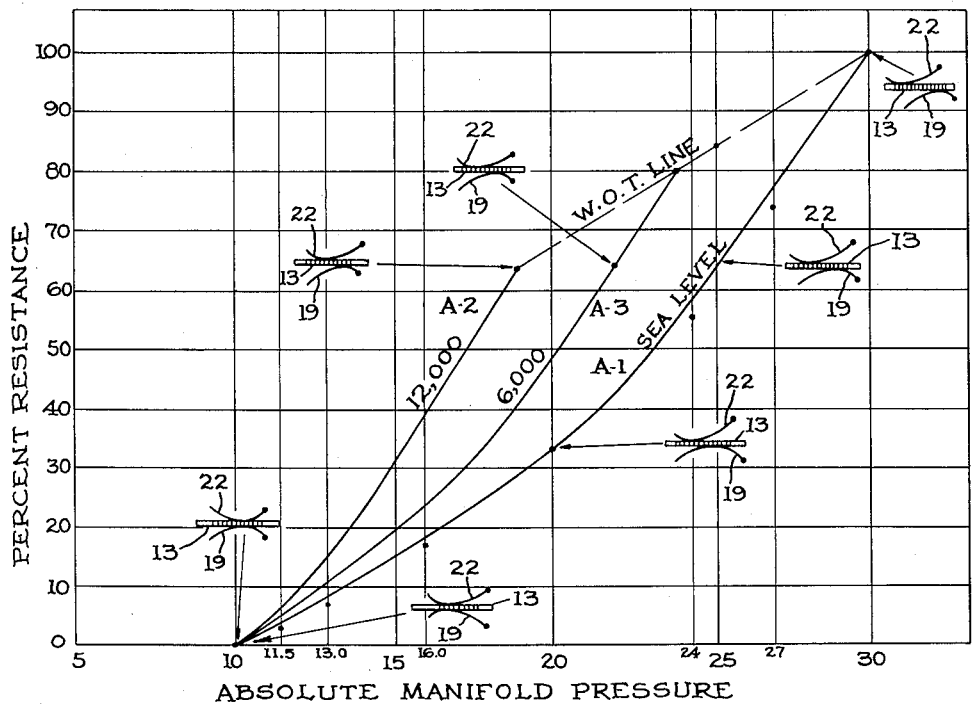
FIG. 4 is an acceleration curve chart, plotting resistance in percentage against manifold pressure absolute at sea level and at different altitudes.

In the example illustrated in FIG. 4, the range of manifold pressure absolute at ground level varies from 10 inches at closed-throttle position to 30 inches at wide-open throttle; and at an altitude of 12,000 feet, the same manifold pressure exists at closed throttle position but the maximum attainable at wide-open throttle is only about 19 inches. Thus when the throttle is moved from a wide-open to a fully-closed position at sea level, the contact 19 will always start at a given position at the right end of the resistor 13 as shown at $a$ in FIG. 3 and traverse a length of the latter equivalent to a drop of 20 inches Hg and come to rest at the left end of the resistor as shown at $b$; while the altitude contact 22 will remain at the left end of the resistor. On the other hand, if the throttle is moved from wide-open to fully-closed position at an altitude of 12,000 feet, contact 19 will still start at the same point at the right end of the resistor as shown at $c$ and traverse a length of the latter equivalent to about 10 inches Hg and stop at an intermediate point as shown at $d$, and the altitude contact 22 will move from the left end of the resistor to line up with 19 at the closed-throttle position. At any altitude, when the throttle is closed, the contacts 19 and 22 will line up for minimum drop across the resistor 13. This results from the fact that the capsule 17 senses both altitude and manifold pressure absolute while the capsule 21 senses altitude.

Figure 3:
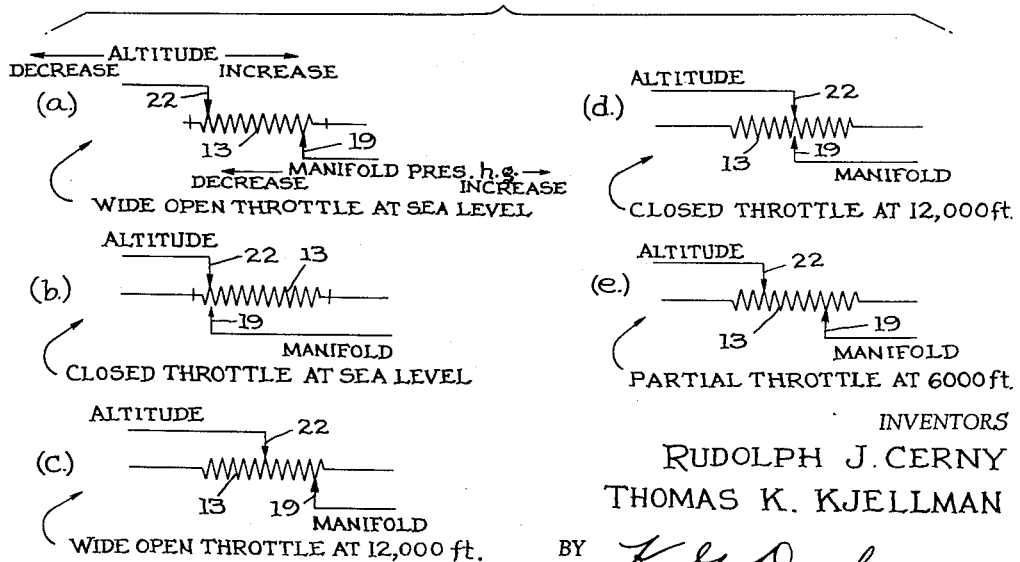
FIG. 3 shows schematically certain relative positions of the manifold pressure and attitude contacts at different altitudes and throttle setting.

The drop across the resistor at $c$ and $d$ in FIG. 3 results in the altitude acceleration curve A–2 of FIG. 4, and this curve conforms to that portion of the sea level acceleration curve A–1 which covers the range of manifold pressures from about 20 to 30 inches Hg. This means that when the throttle is closed at altitude, the absolute manifold pressure will be 10 inches (idling pressure at either altitude or ground level), and when the throttle is moved from closed to open position at altitude, the fuel/air ratio will be maintained at the selected ratio.

Figure 1:
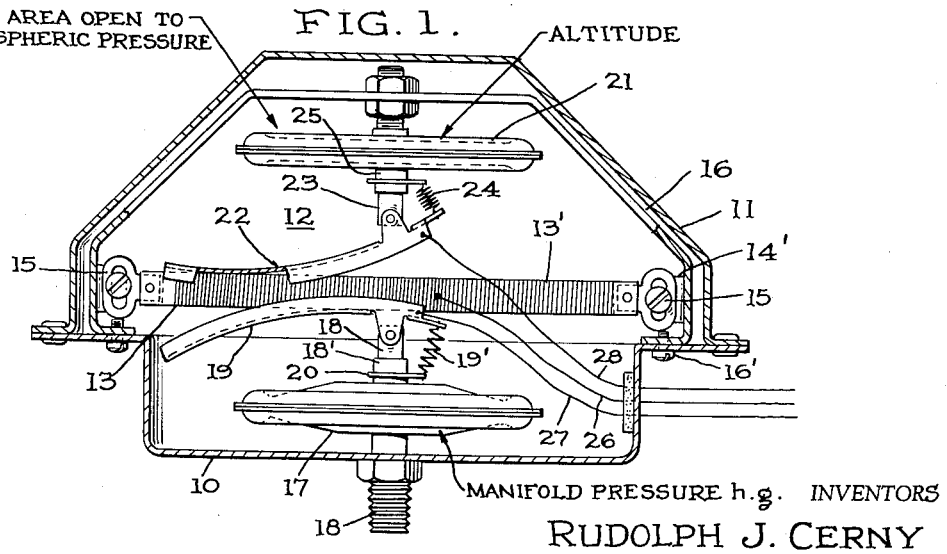
FIG. 1 is a transverse-vertical section of a pressure-responsive control device in accordance with the invention.

When operating over the full throttle range at sea level, substantially the entire effective area of the contact arm 19 comes into play, but when so operating at altitude, only a portion of said arm engages the resistor 13, the right-hand portion as viewed in FIG. 1; whereas altitude is gained, the altitude arm 22 gradually rocks from its left-end (no compensation) toward its right-hand extremity, note the positions in FIG. 4, which of course are only for the purpose of illustration. The fixed curvature of arm 19, to obtain the desired acceleration curve, is such that for a given drive movement of capsule 17, the rate of resistance variation will be faster when the right-hand extremity of said arm is tracking the resistor 13 than is the case when the left-hand extremity is active. This would not affect the selected fuel/air ratio, however, if operation would always be at sea level, but since at altitude the right-hand portion of 19 (from approximately its center to its right end) only tracks the resistor 13, the fuel/air ratio would vary unless compensation were had for this unequal tracking characteristic. Such compensation is provided by the altitude contact arm 22, the contour of which matches or is coordinated with that of the arm 19 to maintain the desired non-linearity of the acceleration curves A–2 and A–3 or any like series of acceleration curves in between and not shown in FIG. 4.

It will thus be seen that the device has all the advantages attributable to the anti-frictional rockable contact type of resistance unit, while at the same time a simple yet highly effective fuel feed control is provided for operation at all altitudes. In practice, to avoid any "rubbing" of the arms 19 and 22 on the resistor 13 due to right-angular drive thrust by the capsules 17 and 21, compensating linkage is interposed between these parts; the direct connection shown in FIGS. 1 and 2 being a simplified version of the device.

What we claim is:

1. A device for varying the resistance in an electrical circuit for controlling the rate of fuel feed to an engine having an air intake manifold provided with a throttle movable to accelerate and decelerate the engine, comprising: a casing defining a chamber vented to the atmosphere, an elongated resistor fixed in said casing and adapted to be connected into said circuit, a first generally arcuate-shaped rockable contact arm engaging said resistor in rolling contact, an aneroid capsule responsive to the differential between manifold pressure absolute and ambient air pressure for actuating said arm, a second generally arcuate shaped contact arm also rockably engaging said resistor in rolling contact, and an aneroid capsule responsive solely to changes in ambient air density for actuating said second arm independently of said first arm to compensate for any variation in the selected fuel/air ratio as altitude is gained.

2. A device for varying the resistance of an electrical circuit for controlling the rate of fuel feed to an engine as a function of manifold pressure and ambient air density, comprising: a resistor adapted to be connected into said circuit, a first arcuate contact arm engaging said resistor and a first pressure responsive capsule responsive to the differential between manifold pressure absolute and ambient air density arranged to actuate said first contact arm, a second arcuate contact arm engaging said resistor and a second pressure responsive capsule responsive solely to changes in ambient air density for actuating said second contact arm, said second arm being operable independently of said first arm to provide the desired compensation in the manifold pressure versus resistance characteristic as altitude is gained.

References Cited in the file of this patent
UNITED STATES PATENTS

| | | |
|---|---|---|
| 1,759,841 | Eltz | May 27, 1930 |
| 1,929,382 | Arthur | Oct. 3, 1933 |
| 2,542,717 | Smith | Feb. 20, 1951 |
| 2,851,230 | Greenland et al. | Sept. 9, 1958 |
| 2,909,062 | Curtis et al. | Oct. 20, 1959 |